United States Patent [19]
Sanpei et al.

[11] Patent Number: 6,107,388
[45] Date of Patent: Aug. 22, 2000

[54] POLYOLEFIN RESIN COMPOSITIONS

[75] Inventors: Akihiko Sanpei; Yozo Shimomura; Tooru Fukazawa; Hiroshi Suzuki, all of Chiba, Japan

[73] Assignee: Chisso Corporation, Osaka, Japan

[21] Appl. No.: 09/297,274

[22] PCT Filed: Aug. 27, 1998

[86] PCT No.: PCT/JP98/03815

§ 371 Date: Apr. 28, 1999

§ 102(e) Date: Apr. 28, 1999

[87] PCT Pub. No.: WO99/11708

PCT Pub. Date: Mar. 11, 1999

[30] Foreign Application Priority Data

Aug. 28, 1997 [JP] Japan ..................................... 9-247774

[51] Int. Cl.⁷ .............................. C08L 53/00; C08L 23/10
[52] U.S. Cl. ........................... 524/451; 524/505; 525/89; 525/95; 525/98
[58] Field of Search ................................. 525/98, 95, 89; 524/451, 505

[56] References Cited

U.S. PATENT DOCUMENTS 4,252,914  2/1981  Halasa et al. .............................. 525/98
5,856,400  1/1999  Matsumura et al. .

FOREIGN PATENT DOCUMENTS

| | | |
|---|---|---|
| 0 225 693 | 2/1988 | European Pat. Off. . |
| 0 700 943 | 3/1996 | European Pat. Off. . |
| 0 739 941 | 10/1996 | European Pat. Off. . |
| 8-41278 | 2/1996 | Japan . |
| 8-41279 | 2/1996 | Japan . |
| 8-67783 | 3/1996 | Japan . |
| 8-104792 | 4/1996 | Japan . |
| 09077953 | 3/1997 | Japan . |
| 2 309 973 | 8/1997 | United Kingdom . |
| WO98/54257 | 3/1998 | WIPO . |
| WO98/54258 | 12/1998 | WIPO . |

*Primary Examiner*—Mark L. Warzel
*Attorney, Agent, or Firm*—Leydig, Voit & Mayer

[57] ABSTRACT

The resin compositions of the present invention have an excellent property balance between rigidity and impact resistance and give interior automotive parts having satisfactory moldability. The compositions are especially suitable for use as interior automotive parts conforming to regulations regarding head protection against impacts.

The invention provides: a polyolefin resin composition comprising 78 to 87% by weight specific high-rigidity polypropylene/propylene-ethylene block copolymer, 12 to 17% by weight ethylene-(higher α-olefin) copolymer rubber, and 1 to 5% by weight hydrogenated diene block copolymer; and a molding resin composition obtained by incorporating, into the above resin composition, talc in an amount of 20 to 25% by weight based on the total weight of the composition and one or more optional additives.

8 Claims, 1 Drawing Sheet

POLYOLEFIN RESIN COMPOSITIONS

TECHNICAL FIELD

The present invention relates to polyolefin resin compositions. More particularly, this invention relates to polyolefin resin compositions which give injection-molded articles having an excellent property balance between rigidity and impact resistance and have excellent flowability.

BACKGROUND ART

Polypropylene resins are extensively used in the fields of automotive parts and other various molded articles including parts for domestic electrical appliances, miscellaneous goods, and films, because molded articles obtained therefrom are excellent in rigidity and high-temperature rigidity. However, the molded articles of general polypropylene resins have insufficient impact resistance and are hence usable in a limited range of applications.

Several methods are known as techniques for improving the impact resistance of polypropylene resins. Representative examples thereof include a technique in which propylene is block-copolymerized with ethylene and a technique in which an ethylene-α-olefin copolymer rubber is incorporated into a polypropylene resin. The polypropylene resins obtained by these techniques are used mainly in applications such as materials for exterior automotive parts such as automotive bumpers and materials for interior automotive parts, such as instrument panels, console boxes, resin pillars, and trims, and as materials for domestic electrical appliances, such as washing tubs, the housings of vacuum cleaners, and the housings of coffee makers. According to need, these polypropylene resins are used after incorporation of an inorganic filler, e.g., talc, thereinto or after addition of a rubber to the block copolymer. Although the impact resistance of polypropylene resin compositions has been improved due to these techniques, the compositions thus improved have new problems, for example, that when a rubber is added in a large amount, the molded articles obtained are reduced in rigidity and high-temperature rigidity and the compositions have reduced flowability. There is hence a desire for the development of a polypropylene resin composition which gives molded articles having improved impact resistance while retaining intact rigidity, high-temperature rigidity, and flowability.

For eliminating the above problem, several proposals have been made. Known as such proposals are: a technique in which a propylene block copolymer improved in the stereoregularity of the propylene homopolymer block is used in order to enhance the reduced rigidity and high-temperature rigidity (Examined Japanese Patent Publication No. 1-254706 and Unexamined Published Japanese Patent Application No. 62-187707); and a technique in which an inorganic filler, e.g., talc, is incorporated into a polypropylene resin. The technique in which the stereoregularity of a propylene homopolymer block is improved is used in various fields because it can improve rigidity and high-temperature rigidity and hardly increases the specific gravity of the composition. On the other hand, the technique in which talc is incorporation is also used frequently. However, problems have been pointed out, for example, that the incorporation of talc not only results in molded articles having an increased specific gravity and hence in increased product weights, but also impairs the flowability of the resultant composition itself.

For the purpose of improving impact resistance, resistance to impact blushing, etc., several techniques have been proposed in which various copolymers are incorporated into a polypropylene resin. For example, Examined Japanese Patent Publication No. 59-37294 discloses a resin composition obtained by incorporating a hydrogenated polybutadiene into a polypropylene resin, and Examined Japanese Patent Publication No. 62-45883 discloses a diblock copolymer comprising a hydrogenated polybutadiene. Furthermore, Unexamined Published Japanese Patent Applications Nos. 4-342752 and 5-132606 disclose a resin composition obtained by incorporating a block copolymer comprising a hydrogenated polybutadiene into a polypropylene resin, and Unexamined Published Japanese Patent Applications Nos. 1-168743 and 1-168744 disclose a resin composition obtained by incorporating a hydrogenated block copolymer of isoprene and butadiene into a polypropylene resin or polyethylene resin.

The above resin compositions generally can have both improved resistance to impact blushing or blushing by bending and improved impact resistance. However, these resins have a problem, for example, that their rigidity and high-temperature rigidity are considerably low for the improvement in impact resistance. Practical applications thereof are hence limited.

When a rubber ingredient such as those described above, which serves to improve the impact resistance of a polypropylene resin composition, is added in a large amount, new problems arise. For example, the resultant composition gives molded articles having reduced rigidity and has impaired flowability. Consequently, attention is focused on the development of a polypropylene resin composition which can give molded articles having improved impact resistance without impairing the rigidity of the molded articles or reducing the flowability of the resin composition. An object of the present invention is to provide polyolefin resin compositions having excellent flowability and giving molded articles excellent in rigidity and impact resistance and in balance between these properties.

The present inventors made intensive investigations in order to eliminate the problems described above. As a result, they have found that a polyolefin resin composition having excellent flowability and giving molded articles having an excellent balance between rigidity and impact resistance is obtained by incorporating a hydrogenated diene block copolymer into a composition comprising an ethylene-(higher α-olefin) copolymer rubber and a high-rigidity polypropylene/propylene-ethylene block copolymer and optionally containing talc. The present invention has been completed based on this finding.

DISCLOSURE OF THE INVENTION

The present invention has the following constitutions.

1) A polyolefin resin composition (A) comprising:

(a) from 83 to 88% by weight high-rigidity polypropylene/propylene-ethylene block copolymer consisting of from 60 to 95% by weight of a propylene homopolymer component which has an isotactic pentad content (P) of 0.96 or higher and an $M_w/M_n$ (Q value) of 6 or lower and in which the ratio of the maximum value of melt flow rate ($MFR_{max}$) to the minimum value thereof ($MFR_{min}$) satisfies the relationship $$0.1 \leq \text{Log}(MFR_{max}/MFR_{min}) \leq 1 \quad (1)$$

and from 5 to 40% by weight of an ethylene-propylene copolymer component having an ethylene content of from 30 to 80% by weight; and (b) from 12 to 17% by weight ethylene-(higher α-olefin) copolymer rubber having an ethylene content of 45% by weight or higher and containing polyethylene crystals having a value of long period as determined by small angle X-ray scattering of from 6 to 14 nm, provided that the sum of (a) and (b) is 100% by weight.

2) A polyolefin resin composition (B) comprising:

from 78 to 87% by weight the high-rigidity polypropylene/propylene-ethylene block copolymer (a) described in 1 above; from 12 to 17% by weight the ethylene-(higher α-olefin) copolymer rubber (b) described in 1 above; and (c) from 1 to 5% by weight hydrogenated diene block copolymer which has a degree of hydrogenation of 85% or higher and is derived from an A-B-A or A-B type diene block copolymer wherein segment A is a 1,4-polybutadiene block and segment B is a 1,2-polybutadiene block, a polyisoprene block, or a butadiene-isoprene copolymer block, provided that the sum of (a), (b), and (c) is 100% by weight.

3) The polyolefin resin composition (C) as described in 1 or 2 above wherein the ethylene-(higher α-olefin) copolymer rubber (b) has a long period of from 8 to 12 nm.

4) The polyolefin resin composition (D) as described in 1 or 2 above wherein the ethylene-(higher α-olefin) copolymer rubber (b) is a binary and/or ternary random copolymer formed from ethylene and one or more higher α-olefins having 4 or more carbon atoms.

5) The polyolefin resin composition (E) as described in 2 above wherein the hydrogenated diene block copolymer (c) is (1) an A-B-A type diene block copolymer wherein segment A is a 1,4-polybutadiene block and segment B is a 1,2-polybutadiene block or (2) an A-B type diene block copolymer wherein segment A is a 1,4-polybutadiene block and segment B is a butadiene-isoprene copolymer block, said copolymers (1) and (2) each having a degree of hydrogenation of 85% or higher.

6) A polyolefin resin molding composition (F) comprising:

from 75 to 80% by weight the polyolefin resin composition as described in any one of 1 to 5 above; and (d) from 20 to 25% by weight talc having an average particle diameter of 3 μm or smaller and a narrow particle size distribution with a particle diameter standard deviation of 0.2 or smaller.

7) A molded resin part for interior automotive use which is a molded article obtained by molding the polyolefin resin molding composition as described in 6 above having a melt flow rate (hereinafter referred to as "MFR"; ASTM D1238) of 20 g/10 min or higher, said molded article having a flexural modulus at 23° C. (ASTM D790) of 2,200 MPa or higher and an Izod impact strength at room temperature (ASTM D256) of 300 J/m or higher.

8) A molded resin part for interior automotive use which is a molded article obtained by molding the polyolefin resin molding composition as described in 6 above having an MFR (ASTM D1238) of 20 g/10 min or higher, said molded article having a high-velocity surface impact strength at 23° C. (impactor velocity: 4 m/s) of 20 J or higher and a high-velocity tensile elongation at 23° C. (cross-head speed: 4 m/s) of 30% or higher.

BEST MODES FOR CARRYING OUT THE INVENTION

The present invention will be explained below in detail.

(a) High-Rigidity Polypropylene/Propylene-Ethylene Block Copolymer

In the polyolefin resin compositions of the present invention, the high-rigidity polypropylene/propylene-ethylene block copolymer (a), consisting of a propylene homopolymer component having a high MFR, high stereoregularity, and a narrow molecular weight distribution and an ethylene-propylene copolymer component having an ethylene content of from 30 to 80% by weight, is the main component of the resin compositions.

The propylene homopolymer component has such high stereoregularity that its isotactic pentad content (P) is 0.96 or higher, and has such a narrow molecular weight distribution that the ratio of the weight-average molecular weight ($M_w$) thereof to the number-average molecular weight ($M_n$) thereof (Q value) both measured by gel permeation chromatography (GPC) is 6 or lower. Furthermore, the ratio of the maximum melt flow rate value ($MFR_{max}$) of the homopolymer component to the minimum melt flow rate value ($MFR_{min}$) thereof both measured in accordance with ASTM D 1238 under the conditions of a measurement temperature of 230° C. and a load of 2.16 kg satisfies the relationship $$0.1 \leq \mathrm{Log}\,(MFR_{max}/MFR_{min}) \leq 1 \tag{1}$$

and preferably satisfies the following relationship.

$$0.2 \leq \mathrm{Log}\,(MFR_{max}/MFR_{min}) \leq 0.5 \tag{2}$$

The amount of the propylene homopolymer component is from 60 to 95% by weight based on the total amount of the high-rigidity polypropylene/propylene-ethylene block copolymer (a) composition to be finally obtained. If the content of the propylene homopolymer component is lower than 60% by weight, products have impaired rigidity. If the content thereof exceeds 95% by weight, the improvement in low-temperature impact strength is insufficient. Isotactic pentad contents (P) lower than 0.96 are undesirable in that molded articles have reduced rigidity, and Q values exceeding 6 are undesirable in that molded articles have reduced impact resistance. Furthermore, maximum MFR value/minimum MFR value ratios lower than 0.1 are undesirable in that products have reduced rigidity, while ratios thereof exceeding 1 are undesirable in that the high-rigidity polypropylene/propylene-ethylene block copolymer (a) composition to be finally obtained has a reduced tensile elongation and reduced impact resistance.

The ethylene-propylene copolymer component comprises a random copolymer of ethylene and propylene which has an ethylene content of from 30 to 80% by weight, preferably from 40 to 70% by weight. Ethylene contents outside the above range are undesirable in that the polymer obtained has impaired rigidity and impact resistance. The amount of the ethylene-propylene copolymer component is from 5 to 40% by weight based on the total amount of the high-rigidity polypropylene/propylene-ethylene block copolymer (a) composition to be finally obtained. Ethylene and propylene may be used in combination with other α-olefins, conjugated dienes, and the like.

The high-rigidity polypropylene/propylene-ethylene block copolymer (a) has an MFR preferably in the range of from 0.1 to 100, more preferably in the range of from 1 to 80. MFR's thereof lower than 0.1 are undesirable in that moldability is reduced, while MFR's thereof exceeding 100 are undesirable in that impact resistance is reduced.

In the polyolefin resin compositions of the present invention, the proportion of the high-rigidity polypropylene/propylene-ethylene block copolymer (a) is from 83 to 88% by weight based on the total weight of the resin components (a) and (b), and is more preferably from 78 to 87% by weight based on the total weight of the resin components (a), (b), and (c).

The high-rigidity polypropylene/propylene-ethylene block copolymer (a) is an ingredient which imparts rigidity and high-temperature rigidity to molded articles. If the proportion thereof is too small [i.e., if it is below 83% by weight in the binary system composed of (a) and (b) or is below 78% by weight in the ternary system composed of (a), (b), and (c)], molded articles have reduced high-temperature rigidity. If the proportion thereof is too large [i.e., if it exceeds 88% by weight in the binary system composed of (a) and (b) or exceeds 87% by weight in the ternary system composed of (a), (b), and (c)], molded articles have reduced impact resistance.

Although the high-rigidity polypropylene/propylene-ethylene block copolymer (a) may be produced by any method as long as the copolymer satisfies the above requirements, it can be easily produced by a two-stage polymerization process comprising polymerization step (I) in which propylene is caused to homopolymerize to produce a propylene homopolymer component having the properties described above and polymerization step (II) in which ethylene and propylene are subsequently copolymerized in the presence of the propylene homopolymer produced in polymerization step (I) to thereby produce an ethylene-propylene copolymer component.

More specifically, in polymerization step (I), two or more polymerization vessels arranged in series are used to form a homopolymer of propylene therein using a polymerization catalyst for highly stereoregular polyolefins, e.g., a catalyst system comprising a combination of a solid catalyst component comprising titanium, magnesium, a halogen, and a polycarboxylic acid ester as essential ingredients, an organoaluminum compound, and an organosilicon compound. Subsequently, in polymerization step (II), one or more polymerization vessels are used to copolymerize ethylene and propylene therein in the presence of the propylene homopolymer component produced to yield an ethylene-propylene copolymer, whereby a high-rigidity polypropylene/propylene-ethylene block copolymer (a) can be produced.

In the present invention, a highly stereoregular catalyst system obtained from a solid catalyst component (A) comprising at least magnesium atoms, titanium atoms, halogen atoms, and a polycarboxylic acid ester, an organoaluminum compound (B), and an electron-donating compound (C) is used as a polymerization catalyst. However, this catalyst is not particularly limited, and various known catalyst systems which give highly stereoregular polypropylene can be used.

The solid catalyst component (A) can be produced, for example, by methods disclosed in Unexamined Published Japanese Patent Applications Nos. 50-108385, 50-126590, 51-20297, 51-28189, 51-64586, 51-92885, 51-136625, 52-87489, 52-100596, 52-147688, 52-104593, 53-2580, 53-40093, 53-40094, 55-135102, 55-135103, 55-152710, 56-811, 56-11908, 56-18606, 58-83006, 58-138705, 58-138706, 58-138707, 58-138708, 58-138709, 58-138710, 58-138715, 60-23404, 61-21109, 61-37802, 61-37803, 62-104810, 62-104811, 62-104812, 62-104813, and 63-54405.

Examples of the polycarboxylic acid ester used in the solid catalyst component (A) include esters of phthalic acid, maleic acid, substituted malonic acids, and the like with alcohols having 2 or more carbon atoms.

Although various magnesium compounds are usable in the solid catalyst component (A) in the present invention, a magnesium compound having a reducing ability or one not having the ability is used.

Examples of the former include dimethylmagnesium, diethylmagnesium, dipropylmagnesium, dibutylmagnesium, ethylmagnesium chloride, propylmagnesium chloride, and butylmagnesium chloride.

Examples of the latter include magnesium halides such as magnesium chloride, magnesium bromide, and magnesium iodide, alkoxymagnesium chlorides such as methoxymagnesium chloride and ethoxymagnesium chloride, alkoxymagnesiums such as ethoxymagnesium, isopropoxymagnesium, and butoxymagnesium, and magnesium carboxylates such as magnesium laurate and magnesium stearate.

Especially preferred compounds among these are magnesium halides, alkoxymagnesium chlorides, and alkoxymagnesiums.

Compounds represented by $Ti(OR)_A X_{4-A}$ (wherein R is a hydrocarbon group, X is a halogen, and $0 \leq A \leq 4$) are usually optimal as the titanium compound for use in the solid catalyst component (A) in the present invention. Examples thereof include titanium tetrahalides such as $TiCl_4$ and $TiBr_4$, alkoxytitanium trihalides such as $Ti(OCH_3)Cl_3$ and $Ti(OC_2H_5)Cl_3$, dialkoxytitanium dihalides such as $Ti(OCH_3)_2Cl_2$ and $Ti(OC_2H_5)_2Cl_2$, trialkoxytitanium monohalides such as $Ti(OCH_3)_3Cl$ and $Ti(OC_2H_5)_3Cl$, and tetraalkoxytitaniums such as $Ti(OCH_3)_4$ and $Ti(OC_2H_5)_4$. Especially preferred is $TiCl_4$.

In preparing the solid catalyst component (A), other electron donors such as, e.g., alcohols, ethers, phenols, silicon compounds, and aluminum compounds may be caused to coexist, according to need, with the titanium compound, magnesium compound, and polycarboxylic acid ester.

The organoaluminum compound (B) for use in the present invention can be one represented by the general formula $AlR^2{}_m R^3{}_n X_{3-(m+n)}$ (wherein $R^2$ and $R^3$ each represents a hydrocarbon group or an alkoxy group; X represents a halogen; and m and n each represents any number satisfying $0 \leq m \leq 3$, $0 \leq n \leq 3$, and $1.5 \leq (m+n) \leq 3$).

Examples thereof include trimethylaluminum, triethylaluminum, tri-n-propylaluminum, tri-n-butylaluminum, triisobutylaluminum, diethylaluminum chloride, di-n-propylaluminum monochloride, diethylaluminum iodide, methylaluminum sesquichloride, ethylaluminum sesquichloride, and ethoxydiethylaluminum.

These organoaluminum compounds (B) can be used alone or as a mixture of two or more thereof.

The electron-donating compound (C) for use in the present invention can be an organosilicon compound represented by the general formula $R^4{}_x R^5{}_y Si(OR^6)_z$ (wherein $R^4$ and $R^6$ each represents a hydrocarbon group; $R^5$ represents a hydrocarbon group or a hydrocarbon group containing one or more heteroatoms; and $x+y+z=4$, $0 \leq x \leq 2$, $1 \leq y \leq 3$, and $1 \leq z \leq 3$).

Examples thereof include methyltrimethoxysilane, methyltriethoxysilane, methyltripropoxysilane, ethyltrimethoxysilane, ethyltriethoxysilane, ethyltripropoxysilane, n-propyltrimethoxysilane, n-propyltriethoxysilane, isopropyltrimethoxysilane, isopropyltriethoxysilane, n-butyltrimethoxysilane, n-butyltriethoxysilane, isobutyltrimethoxysilane, isobutyltriethoxysilane, t-butyltrimethoxysilane, t-butyltriethoxysilane, n-pentyltrimethoxysilane, n-pentyltriethoxysilane, neopentyltrimethoxysilane, neopentyltriethoxysilane, hexadecyltrimethoxysilane, hexadecyltriethoxysilane, dimethyldimethoxysilane, dimethyldiethoxysilane, diethyldimethoxysilane, diethyldiethoxysilane, di-n-propyldimethoxysilane, diisopropyldimethoxysilane, di-n-butyldimethoxysilane, diisobutyldimethoxysilane, di-t-butyldimethoxysilane, di-n-pentyldimethoxysilane, dineopentyldimethoxysilane, phenyltrimethoxysilane, phenyltriethoxysilane, diphenyldimethoxysilane, diphenyldiethoxysilane, cyclohexyltrimethoxysilane, cyclohexyltriethoxysilane, dicyclohexyldimethoxysilane, dicyclohexyldiethoxysilane, 3-mercaptopropylmethyldimethoxysilane, 3-isocyanatopropyltriethoxysilane, and 2-(3-cyclohexenyl)ethyltrimethoxysilane.

These organosilicon compounds can be used either alone or as a mixture of two or more thereof in any proportion. Especially preferred organosilicon compounds among these are diisopropyldimethoxysilane, t-butyltriethoxysilane, t-butyltrimethoxysilane, isobutyltrimethoxysilane, and cyclohexyltrimethoxysilane. The preferred addition amount of the organosilicon compound (C) relative to the organoaluminum compound (B), in terms of (B)/(C) molar ratio, is from 1 to 15. If that molar ratio exceeds 15, the improvement in rigidity is insufficient. If that molar ratio is below 1, the catalytic activity is reduced and the catalyst is unsuitable for practical use.

The solid catalyst component (A) in combination with the organoaluminum compound (B) and the above-described organosilicon compound (C) is used as a catalyst for the polymerization of propylene. More preferably, the solid catalyst component (A) is reacted with an α-olefin and then used as a preliminarily activated catalyst. The preliminary activation is preferably conducted in such a manner that the organoaluminum compound (B) is used in an amount of from 0.3 to 20 mol per mol of the titanium contained in the solid catalyst component (A), and an α-olefin is reacted in an amount of from 0.1 to 10 mol, preferably from 0.3 to 3 mol, at 0 to 50° C. for 1 minute to 20 hours.

The reaction of an α-olefin for preliminary activation may be conducted in an aliphatic or aromatic hydrocarbon solvent. Alternatively, a liquefied α-olefin such as liquefied propylene or liquefied butene-1 may be reacted without using a solvent, or ethylene, propylene, or the like may be reacted in a vapor phase. Furthermore, the reaction may be conducted in the presence of an α-olefin polymer obtained beforehand or of hydrogen. It is also possible to add beforehand the organosilicon compound (C) in the preliminary activation.

α-Olefins usable for the preliminary activation include linear monoolefins such as ethylene, propylene, butene-1, hexene-1, and heptene-1, branched monoolefins such as 4-methylpentene-1, 2-methylpentene-1, and 3-methylbutene-1, and styrene. These α-olefins may be used as a mixture with the α-olefin to be polymerized.

After completion of the preliminary activation, the solvent, organoaluminum compound, unreacted α-olefin, and organosilicon compound may be filtered off or decantation, or the solid matter may be dried and used as a powder.

The preliminarily activated catalyst thus obtained can be used in slurry polymerization in which propylene is polymerized in a hydrocarbon solvent, e.g., n-hexane, n-heptane, n-octane, benzene, or toluene, bulk polymerization conducted in liquefied propylene, and gas-phase polymerization.

In the case of slurry polymerization, it is usually conducted at a polymerization temperature of from 20 to 90° C., preferably from 50 to 80° C., and a polymerization pressure of from 0 to 5 MPa. In the case of vapor-phase polymerization, it is usually conducted at a polymerization temperature of from 20 to 150° C. and a polymerization pressure of from 0.2 to 5 MPa. Hydrogen is usually used for molecular-weight control so that the polymerization finally yields a polymer having an MFR in the range of from 0.1 to 1,000.

Polymerization step (II) is usually conducted by copolymerizing ethylene and propylene at a polymerization temperature of from 20 to 80° C., preferably from 40 to 70° C., and a pressure of from 0 to 5 MPa. There are no particular limitations on methods for feeding ethylene and propylene to the polymerizer and on polymerization types. Hydrogen is usually used for molecular-weight control in a concentration in the vapor phase of from 0.1 to 10 mol %. The polymerization in polymerization step (II) is conducted using one polymerization vessel or two polymerization vessels connected to each other.

The polymer finally obtained has an MFR preferably in the range of from 0.1 to 100, more preferably in the range of from 1 to 80. MRF's thereof lower than 0.1 are undesirable in that moldability is reduced, while MRF's thereof exceeding 100 are undesirable in that impact resistance is reduced.

(b) Ethylene-(Higher α-Olefin) Copolymer Rubber

The ethylene-(higher α-olefin) copolymer rubber (b) used in the polyolefin compositions of the present invention contains ethylene components in an amount of 45% by weight or larger and has a long period as determined by Small angle X-ray scattering of from 6 to 14 nm, preferably from 8 to 12 nm. Long periods shorter than 6 nm are undesirable for the ethylene-(higher α-olefin) copolymer rubber (b) in that the polyethylene crystals cannot sufficiently function as pseudo-crosslinked molecules to reinforce the rubber. Long periods exceeding 14 nm are undesirable in that the polyethylene crystals are so large that considerable phase separation from the polypropylene resin occurs. As a result, molded articles obtained from the resultant resin composition have a reduced tensile elongation and are undesirable.

The ethylene-(higher α-olefin) copolymer rubber (b) is preferably a binary and/or ternary random copolymer obtained from ethylene and one or more higher α-olefins having 4 or more carbon atoms. One or more members selected from binary copolymer rubbers such as ethylene-1-butene copolymer rubbers, ethylene-1-hexene copolymer rubbers, and ethylene-1-octene copolymer rubbers and/or ternary copolymer rubbers such as ethylene-1-butene-1-hexene copolymer rubbers can be advantageously used.

Although the molecular weight of the ethylene-(higher α-olefin) copolymer rubber (b) is not particularly limited, the copolymer rubber (b) can have an MI, melt index (ASTM D-1238), of from 0.1 to 30 g/10 min. The ethylene content in the ethylene-(higher α-olefin) copolymer rubber (b) is preferably from 45 to 90% by weight.

The ethylene-(higher α-olefin) copolymer rubber (b), which has the effect of improving impact resistance, is contained in an amount of from 12 to 17% by weight. If the content thereof is lower than 12% by weight, the effect of improving impact resistance is insufficient. If it exceeds 17% by weight, there is a fear that rigidity and high-temperature rigidity may be reduced or the composition may have impaired flowability.

Examples of the material of the ethylene-(higher α-olefin) copolymer rubber (b) for use in the present invention and of processes for producing the same include ethylene-1-butene, ethylene-1-hexene, ethylene-4-methyl-1-pentene, and ethylene-1-octene copolymer rubbers obtained by polymerizing ethylene with a substantially linear olefin polymer such as that disclosed in Unexamined Published Japanese Patent Application No. 6-306121 and with one or more α-olefins having 4 to 20 carbon atoms while continuously contacting the reactants, under polymerization conditions, with a catalyst composition comprising a metal in Groups 3 to 10 of the periodic table or in the lanthanide series, a metal coordination complex, and an activating cocatalyst.

(c) Hydrogenated Diene Block Copolymer

The hydrogenated diene block copolymer (c) in the present invention is represented by the general formula A-B-A or A-B.

"A" is a 1,4-polybutadiene segment which, upon examination with a differential scanning calorimeter, gives a melting curve having a maximum peak at 80 to 120° C., while B is a 1,2-polybutadiene block, polyisoprene block, or butadiene-isoprene copolymer block segment.

The 1,4-polybutadiene segment A functions to enhance compatibility with the ethylene-(higher α-olefin) copolymer rubber (c). 1,4-Polybutadiene segments having a melting point not lower than 80° C. are preferred in that they have high crystallinity and improve compatibility.

On the other hand, the 1,2-polybutadiene block, polyisoprene block, and/or butadiene-isoprene copolymer block segment B functions to enhance compatibility with the polypropylene resin (a).

The hydrogenated diene block copolymer (c) used in the present invention functions as a compatibilizing agent for the polypropylene resin (a) and the ethylene-(higher α-olefin) copolymer rubber (b) to finely disperse the rubber particles and thus improve impact resistance.

The hydrogenated diene block copolymer (c) can be obtained, for example, by the following methods. That is, examples thereof include: a di- or triblock copolymer of hydrogenated polybutadiene obtained by hydrogenating a block polymer of polybutadiene formed by polymerizing 1,2-butadiene and 1,4-butadiene while controlling the selectivity thereof, such as those disclosed in Examined Japanese Patent Publication No. 62-45883 and Unexamined Published Japanese Patent Application No. 4-342752; a di- or triblock copolymer of hydrogenated polybutadiene/butadiene-isoprene copolymer formed by hydrogenating a block copolymer composed of a butadiene-isoprene random copolymer and 1,4-polybutadiene, such as those disclosed in Unexamined Published Japanese Patent Applications Nos. 1-168743 and 1-168744; and a di- or triblock copolymer of hydrogenated polybutadiene-isoprene formed by hydrogenating a block copolymer composed of 1,4-polybutadiene and polyisoprene.

The hydrogenated diene block copolymer (c), which is an A-B-A type or A-B type diene block copolymer wherein segment A is a 1,4-polybutadiene block and segment B is a 1,2-polybutadiene block, polyisoprene block, or butadiene-isoprene copolymer block, has a degree of hydrogenation of 85% or higher.

Preferred hydrogenated diene block copolymers (c) are (1) an A-B-A type diene block copolymer wherein segment A is a 1,4-polybutadiene block and segment B is a 1,2-polybutadiene block and (2) an A-B type diene block copolymer wherein segment A is a 1,4-polybutadiene block and segment B is a butadiene-isoprene copolymer block. The above copolymers (1) and (2) each has a degree of hydrogenation of 85% or higher.

In order for the hydrogenated diene block copolymer (c) to function as a compatibilizing agent, it more preferably is linear.

When incorporated in an amount of from 1 to 5% by weight into the polyolefin resin composition (A) of the present invention, the hydrogenated diene block copolymer (c) is highly effective as a compatibilizing agent in dispersing the ethylene-(higher α-olefin) copolymer rubber to thereby inhibit thermal phase separation during molding. As long as the copolymer (c) is incorporated in an amount of from 1 to 5% by weight, it neither plasticizes/softens the polypropylene resin (a) nor impairs the rigidity and high-temperature rigidity of molded articles to be obtained.

(d) Talc

Incorporation of talc (d) into the polyolefin resin compositions (A) to (E) of the present invention produces the effect of improving rigidity of molded articles. Talc incorporation into resin compositions exerts adverse influences. For example, it impairs the flowability, heightens the specific gravity to result in increased product weights, and generates a flow mark on molding surfaces. It is therefore important to regulate the content of talc to the minimum necessary amount. The incorporation of talc (d) in an amount of from 20 to 25% by weight based on each composition is effective in giving molded articles having improved rigidity and high-temperature rigidity and retaining a flexural modulus of at least 2,200 MPa, which is a basic performance required of interior automotive materials. The incorporation thereof does not impair the high-velocity tensile elongation and impact resistance of the molded articles obtained, and is less apt to generate a flow mark on molding surfaces.

The talc (d) which can be incorporated into the polyolefin resin compositions (A) to (E) of the present invention has an average particle diameter of 3 μm or smaller and a narrow particle size distribution with a standard deviation thereof of 0.2 or smaller.

Use of the talc (d) having such a narrow particle size distribution can produce the effect originally possessed by talc, i.e., the effect of improving the rigidity and high-temperature rigidity of molded articles, without impairing impact resistance, especially surface impact resistance.

The average particle diameter and particle size distribution were herein determined with Shimadzu Laser Diffraction Distribution Analyzer SALD-2000.

The polyolefin resin compositions (A) to (F) of the present invention may suitably contain one or more of various additives according to need, such as, e.g., antioxidants, antistatic agents, colorants (pigments), nucleating agents, slip agents, release agents, flame retardants, ultraviolet absorbers, weathering agents, plasticizers, and free-radical generators, as long as the effects of the present invention are not lessened by these additives.

Examples of methods for producing the polyolefin resin compositions (A) to (F) of the present invention include a method in which given amounts of the ingredients of a composition of the present invention, a stabilizer, and a colorant are stirred and mixed with each other by means of a ribbon blender, tumbling mixer, Henschel mixer (trade name), supermixer, or the like, and the resultant mixture is melt-kneaded with a roll mill, Banbury mixer, Labo Plastomill, single- or twin-screw extruder, or the like at a melting temperature of from 150° C. to 300° C., preferably from 180° C. to 250° C., and then pelletized.

The thus-obtained polyolefin resin compositions (A) to (F) of the present invention are subjected to production of various molded articles by any of various molding techniques including injection molding, injection compression molding, extrusion molding, vacuum forming, and air-pressure forming. Especially preferred among these techniques for producing molded articles therefrom is injection molding or injection compression molding.

Specific examples of molded articles for which the compositions are suitable include interior automotive parts, in particular, pillars and quarter trims conforming to regulations regarding head protection against impacts and door trims conforming to regulations regarding lateral clash.

EXAMPLES

The present invention will be explained below in detail by reference to Examples and Comparative Examples. However, the invention should not be construed as being limited by these Examples.

Properties of composition ingredients used in the Examples and Comparative Examples are shown below.

<1> Composition Ingredients (a) Propylene/ethylene-propylene block copolymer

|  | Component No. | |
| --- | --- | --- |
|  | a-1 | a-2 |
| Propylene homopolymer component |  |  |
| Isotactic pentad content (P) | 0.996 | 0.955 |
| Q value | 5.0 | 5.7 |
| MFR [g/10 min] | 36 | 35 |
| Log (MFR$_{max}$/MFR$_{min}$) | 0.18 | 0.24 |
| Content [wt %] | 86 | 87 |
| Ethylene-propylene copolymer component |  |  |
| Ethylene content [wt %] | 50 | 59 |
| Content [wt %] | 14 | 13 |
| Polypropylene/ethylene-propylene copolymer |  |  |
| MFR [g/10 min] | 30 | 30 |

(b) Ethylene-(higher α-olefin) copolymer rubber

| Component No. | α-Olefin | Ethylene content [wt %] | MI [g/10 min] | Long period [nm] |
| --- | --- | --- | --- | --- |
| b-1 | 1-octene | 77.9 | 2.9 | 9.3 |
| b-2 | 1-octene | 76.3 | 1.1 | 8.6 |
| b-3 | 1-octene | 76.2 | 4.3 | 9.2 |
| b-4 | 1-butene | 90 | 2.1 | 11.2 |
| b-5 | 1-butene | 80 | 3.0 | 10.2 |
| b-6 | 1-butene | 85 | 3.6 | 10.9 |
| b-7 | 1-hexene | 85 | 1.3 | 11.0 |
| b-8 | 1-hexene, 1-butene (hexene content: 14 wt %) | 85 | 3.5 | 10.8 |
| b-9 | propylene | 78 | 0.4 | 15.6 |

(Mooney Viscosity: ML$_{1+4}$ (100° C.) = 60

(c) Hydrogenated diene block copolymer

|  | Component No.: c-1 |
| --- | --- |
| Structure | A-B-A type |
| MFR [g/10 min] (230° C., 2.16 kg load) | 1.4 |
| Degree of hydrogenation [%] | 95 |
| Segment A | 1,4-polybutadiene |
| Content [wt %] | 30 |
| Melting temperature [° C.] | 97 |
| Segment B-A | 1,2-polybutadiene/ 1,4-polybutadiene |
| Content [wt %] | 70 |

|  | Component No.: c-2 |
| --- | --- |
| Structure | A-B-A type |
| MFR [g/10 min] (230° C., 2.16 kg load) | 0.4 |
| Degree of hydrogenation [%] | 95 |
| Segment A | 1,4-polybutadiene |
| Content [wt %] | 30 |
| Melting temperature [° C.] | 92 |
| Segment B-A | 1,2-polybutadiene/ 1,4-polybutadiene |
| Content [wt %] | 70 |

|  | Component No.: c-3 |
| --- | --- |
| Structure | A-B type |
| MFR [g/10 min] (230° C., 2.16 kg load) | 14 |
| Degree of hydrogenation [%] | 95 |
| Segment A | 1,4-polybutadiene |
| Content [wt %] | 30 |
| Melting temperature [° C.] | 92 |
| Segment B | 1,2-polybutadiene/isoprene |
| Content [wt %] | 70 |

(d) Talc

|  | Component No. | | |
| --- | --- | --- | --- |
|  | d-1 | d-2 | d-3 |
| Average particle diameter [μm] | 2.2 | 3.5 | 1.8 |
| Standard deviation of particle diameter distribution | 0.18 | 0.19 | 0.22 |

<2> Methods for Property Determination

Properties of each of the ingredients described above were determined by the following methods.

(1) Isotactic pentad content (P): The content is determined according to *Macromolecules*, Vol.8, p.687(1975). The content is the content of isotactic pentads in the polypropylene molecular chain as determined by $^{13}$C-NMR spectrometry.

(2) Average molecular weight ($M_n$, $M_w$): A sample was dissolved in 135° C. o-dichlorobenzene, and the solution was examined with GPC (gel permeation chromatograph) Type 150C, manufactured by Waters Inc. The column used was TSK GEL GMH6-HT.

(3) Ethylene content: The content was determined by infrared absorption spectrometry. (unit: wt %)

Copolymers were prepared beforehand using various monomer proportions (W1, W2) in polymerization step (I) and polymerization step (II), i.e., various ethylene/propylene reaction ratios, and these copolymers were used as standard samples to obtain a calibration curve with infrared absorption spectra. The ethylene/propylene reaction ratio in polymerization step (II) was determined, and the desired ethylene content was calculated from that ratio and from the ethylene content of the whole polymer. (weight/weight)

(4) Long period of ethylene-(higher α-olefin) copolymer rubber (b)

Pellets obtained were melted by heating at 230° C. and 10 MPa for 5 minutes and the melt was cooled at 50° C. and 10 MPa to obtain a sheet having a thickness of 500 μm.

The sheet obtained was examined with X-ray diffractometer JEOL 8200T (manufactured by JEOL Ltd.) to determined the long period by small angle X-ray scattering.

Radiation source, Cu—K$_\alpha$ line; step angle, 0.02°; scanning range, −4° to +4°.

(5) Melting temperature of segment A of hydrogenated diene block copolymer (c)

Ten milligrams of a sample is placed in a differential scanning calorimeter (DSC Type 1090, manufactured by E. I. du Pont de Nemours & Co.). The sample is first heated to 230° C. at a rate of 30° C./min and held at 230° C. for 10 minutes. The sample is then cooled to −60° C. at a rate of 20° C./min and held at −60° C. for 10 minutes. Thereafter, the sample is heated at a rate of 20° C./min to obtain a thermogram. The melting temperature is determined from the peak position in the thermogram.

(6) Melt flow rate: MFR (g/10 min)

Pellets obtained were examined under the conditions of 230° C. and a load of 2.16 kg (according to ASTM D1238) to evaluate flowability.

(7) Melt index: MI (g/10 min)

Pellets obtained were examined under the conditions of 190° C. and a load of 2.16 kg (according to ASTM D1238) to evaluate flowability.

<3> Preparation of Resin Compositions

Examples 1 to 14 and Comparative Examples 1 to 8

The ingredients shown above were mixed in each of the proportions (parts by weight) shown in Tables 1 to 3. To each mixture were added 0.05 part by weight of tetrakis [methylene-3-(3,5-di-t-butyl-4-hydroxyphenyl)propionate] methane as a phenolic antioxidant as a stabilizer, 0.05 part by weight of tetrakis(2,4-di-butylphenyl)-4,4-biphenylene-diphosphonite as a phosphorus compound antioxidant as another stabilizer, 0.1 part by weight of calcium stearate as a neutralizing agent, and 0.2 part by weight of zinc stearate as a dispersant. Each resultant mixture was stirred with a Henschel mixer (trade name) for 3 minutes, and was then melt-kneaded under the conditions of 200° C. and pelletized using twin-screw kneading extruder PCM-45 (manufactured by Ikegai Tekko-sha). Thus, resin compositions for interior automotive use were prepared.

<4> Molding of the Resin Compositions

Using pellets of each of the thus-prepared resin compositions of Examples and Comparative Examples, test pieces for MFR measurement and other given test pieces were molded by injection molding at a molding temperature of 210° C. and a mold temperature of 40° C. The test pieces obtained were subjected to various evaluation tests. The results of the tests are shown in Tables 1 to 3.

<5> Evaluation Tests (1) Flexural modulus (three-point bending modulus) (MPa)

Pellets obtained were used to form test pieces having a length of 130 mm, a width of 13 mm, and a thickness of 6.4 mm by injection molding. The test pieces were examined for flexural modulus under the conditions of 23° C. (according to ASTM D790) to evaluate rigidity.

(2) Izod impact strength (J/m)

Pellets obtained were used to form test pieces having a length of 63.5 mm, a width of 12.7 mm, and a thickness of 6.4 mm by injection molding. The test pieces were notched and then examined for Izod impact strength at 23° C. (according to ASTM D256) to evaluate impact resistance.

(3) High-velocity surface impact strength (J)

Figure 1:
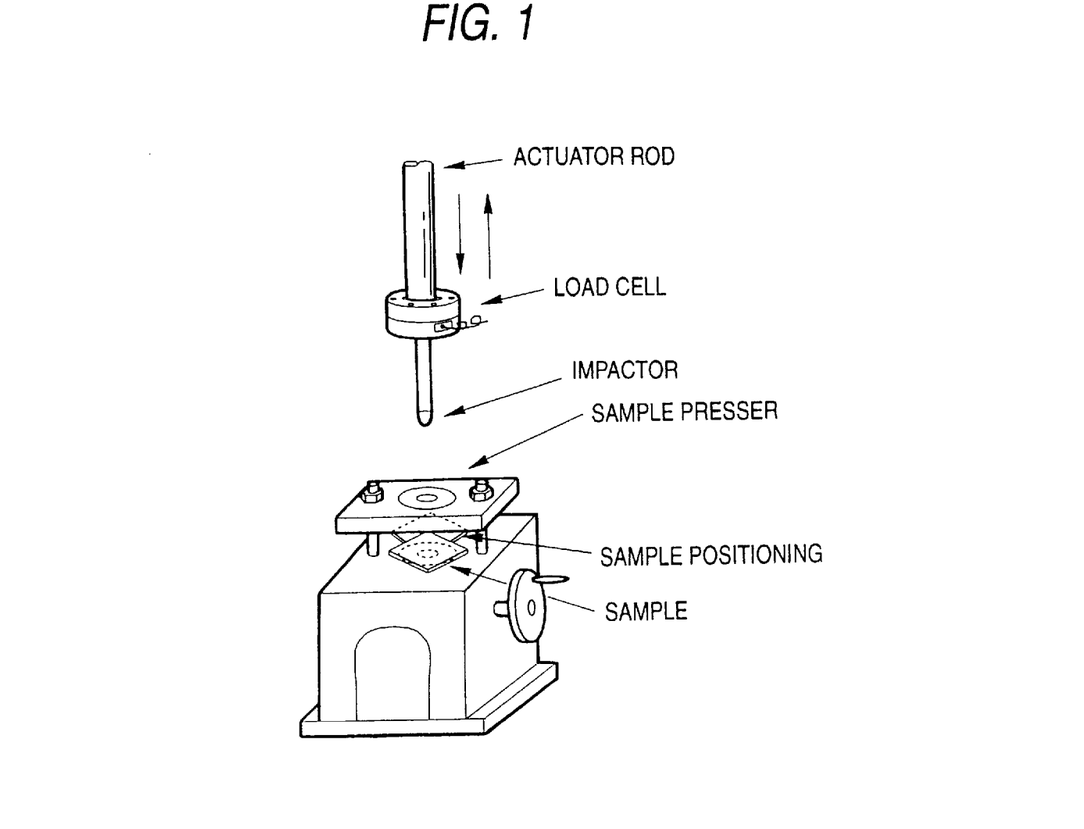
FIG. 1 is a diagrammatic slant view of an apparatus for measuring high-velocity surface impact strength.

Pellets obtained were used to form test pieces having a length of 100 mm, a width of 100 mm, and a thickness of 2.5 mm by injection molding. The test pieces were examined for high-velocity surface impact strength with the apparatus illustrated in FIG. 1 under the conditions shown below. Thus, the total energy of the sample was evaluated.

Testing apparatus: survopulser high-velocity impact tester Type EHF-2H-20L, manufactured by Shimadzu Corp.

Conditions:

| | | |
|---|---|---|
| (1) | Load cell (impactor) Diameter ϕ | ½ inch |
| | Tip | R ¼ inch |
| | Capacity | 2 tons |
| | Type | RC-402-2T |
| (2) | Pad Hole diameter ϕ | 1.5 inches |
| (3) | Testing speed | 4.4 m/sec |
| (4) | Displacement stroke | 220 mm |

(4) High-velocity tensile elongation (%)

Figure 2:
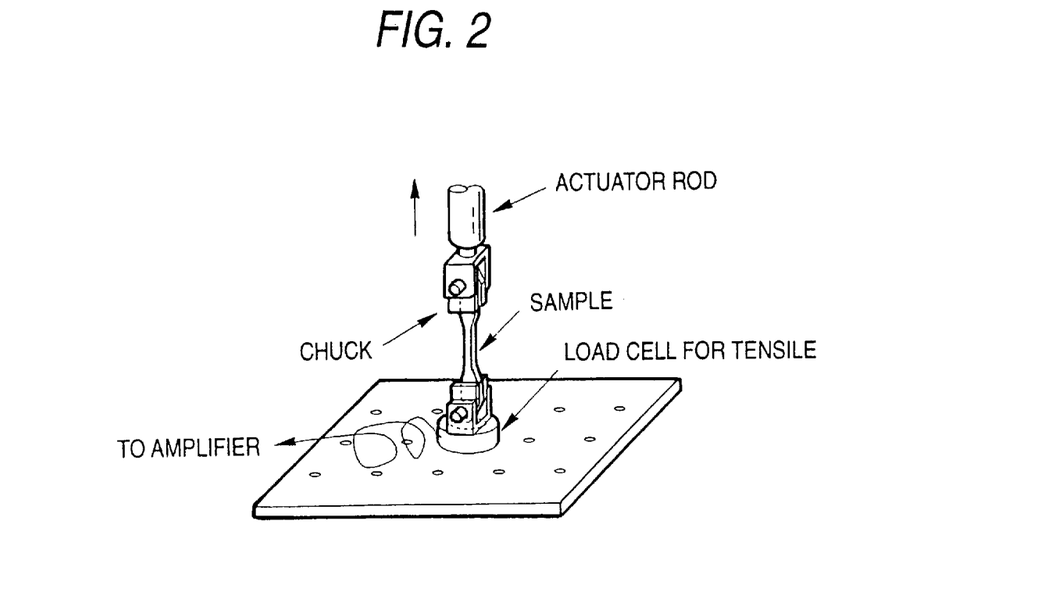
FIG. 2 is a diagrammatic slant view of an apparatus for measuring high-velocity tensile elongation.

Pellets obtained were used to form test pieces having a length of 246 mm, a width of 19 mm, and a thickness of 3.2 mm by injection molding. The test pieces were examined with the apparatus illustrated in FIG. 2 under the conditions shown below. The displacement of high-velocity pulling was divided by the length of each test piece (246 mm), and this value was taken as the high-velocity tensile elongation.

Testing apparatus: survopulser high-velocity impact tester Type EHF-2H-20L, manufactured by Shimadzu Corp.

Conditions:

| | | |
|---|---|---|
| (1) | Load cell | |
| | Capacity | 2 tons |
| | Type | SH-402-2T |
| (2) | Distance between chucks | 115 mm |
| (3) | Testing speed | 4 m/sec (with no assist jig) |

TABLE 1

| Ingredients | Example 1 | Comparative Example 1 |
|---|---|---|
| Propylene/ethylene-propylene block copolymer | | |
| a-1 | 84 | |
| a-2 | | 84 |
| Ethylene-1-octene copolymer rubber | | |
| b-1 | 16 | 16 |
| b-2 | | |
| b-3 | | |
| Ethylene-1-butene copolymer rubber | | |
| b-4 | | |
| b-5 | | |
| b-6 | | |
| Ethylene-1-hexene copolymer rubber | | |
| b-7 | | |
| Ethylene-1-hexene-1-butene copolymer rubber | | |
| b-8 | | |
| Ethylene-propylene copolymer rubber | | |
| b-9 | | |
| Ethylene block copolymer | | |
| c-1 | | |
| c-2 | | |
| c-3 | | |

TABLE 1-continued

| Ingredients | Example 1 | Comparative Example 1 |
|---|---|---|
| Talc | | |
| d-1 | | |
| d-2 | | |
| d-3 | | |
| Evaluation results | | |
| (1) Melt flow rate (g/10 min) | 23 | 23 |
| (2) Flexural modulus (MPa) | 960 | 800 |
| (3) Izod impact strength (J/m) | 310 | 310 |
| (4) High-velocity surface impact strength (J) | 10.3 | 9.6 |
| (5) High-velocity tensile elongation (%) | >100 | >100 |

TABLE 2

| Ingredients | Example 2 | Comparative Example 2 |
|---|---|---|
| Propylene/ethylene-propylene block copolymer | | |
| a-1 | 84 | |
| a-2 | | 84 |
| Ethylene-1-octene copolymer rubber | | |
| b-1 | 13 | 13 |
| b-2 | | |
| b-3 | | |
| Ethylene-1-butene copolymer rubber | | |
| b-4 | | |
| b-5 | | |
| b-6 | | |
| Ethylene-1-hexene copolymer rubber | | |
| b-7 Ethylene-1-hexene-1-butene copolymer rubber | | |
| b-8 Ethylene-propylene copolymer rubber | | |
| b-9 Ethylene block copolymer | | |
| c-1 | 3 | 3 |
| c-2 | | |
| c-3 | | |
| Talc | | |
| d-1 | | |
| d-2 | | |
| d-3 | | |
| Evaluation results | | |
| (1) Melt flow rate (g/10 min) | 22 | 22 |
| (2) Flexural modulus (MPa) | 1000 | 840 |
| (3) Izod impact strength (J/m) | 360 | 350 |
| (4) High-velocity surface impact strength (J) | 10.7 | 9.8 |
| (5) High-velocity tensile elongation (%) | >100 | >100 |

TABLE 3-1

| Ingredients | Example 3 | Example 4 | Example 5 | Example 6 | Example 7 | Example 8 |
|---|---|---|---|---|---|---|
| Propylene/ethylene-propylene block copolymer | | | | | | |
| a-1 | 59 | 59 | 59 | 64 | 62 | 60 |
| a-2 | | | | | | |
| Ethylene-1-octene copolymer rubber | | | | | | |
| b-1 | 16 | 13 | | | | |
| b-2 | | | 13 | 13 | 6.5 | |
| b-3 | | | | | 6.5 | |
| Ethylene-1-butene copolymer rubber | | | | | | |
| b-4 | | | | | | 17 |
| b-5 | | | | | | |
| b-6 | | | | | | |
| Ethylene-1-hexene copolymer rubber | | | | | | |
| b-7 Ethylene-1-hexene-1-butene copolymer rubber | | | | | | |
| b-8 Ethylene-propylene copolymer rubber | | | | | | |
| b-9 Ethylene block copolymer | | | | | | |
| c-1 | | 3 | 3 | 3 | 5 | 3 |
| c-2 | | | | | | |
| c-3 | | | | | | |
| Talc | | | | | | |
| d-1 | 25 | 25 | 25 | 20 | 20 | 20 |
| d-2 | | | | | | |
| d-3 | | | | | | |
| Evaluation results | | | | | | |
| (1) Melt flow rate (g/10 min) | 23 | 21 | 20 | 20 | 20 | 20 |
| (2) Flexural modulus (MPa) | 2250 | 2350 | 2410 | 2310 | 2380 | 2240 |

TABLE 3-1-continued

| Ingredients | Example 3 | 4 | 5 | 6 | 7 | 8 |
|---|---|---|---|---|---|---|
| (3) Izod impact strength (J/m) | 430 | 450 | 300 | 310 | 320 | 480 |
| (4) High-velocity surface impact strength (J) | 23.9 | 25.0 | 21.1 | 20.9 | 22.2 | 24.5 |
| (5) High-velocity tensile elongation (%) | 46 | 51 | 34 | 35 | 36 | 55 |

TABLE 3-2

| Ingredients | Example 9 | 10 | 11 | 12 | 13 | 14 |
|---|---|---|---|---|---|---|
| Propylene/ethylene-propylene block copolymer | | | | | | |
| a-1 | 60 | 60 | 61 | 60 | 60 | 64 |
| a-2 | | | | | | |
| Ethylene-1-octene copolymer rubber | | | | | | |
| b-1 | | | | | | |
| b-2 | | | | | | |
| b-3 | | | | | | |
| Ethylene-1-butene copolymer rubber | | | | | | |
| b-4 | | | | | 17 | 13 |
| b-5 | 17 | | 7.5 | | | |
| b-6 | | 17 | | | | |
| Ethylene-1-hexene copolymer rubber | | | | | | |
| b-7 | | | 7.5 | | | |
| Ethylene-1-hexene-1-butene copolymer rubber | | | | | | |
| b-8 | | | | 17 | | |
| Ethylene-propylene copolymer rubber | | | | | | |
| b-9 Ethylene block copolymer | | | | | | |
| c-1 | 3 | 3 | 4 | 3 | | |
| c-2 | | | | | 3 | |
| c-3 | | | | | | 3 |
| Talc | | | | | | |
| d-1 | 20 | 20 | 20 | 20 | 20 | 20 |
| d-2 | | | | | | |
| d-3 | | | | | | |

TABLE 3-2-continued

| Ingredients | Example 9 | 10 | 11 | 12 | 13 | 14 |
|---|---|---|---|---|---|---|
| Evaluation results | | | | | | |
| (1) Melt flow rate (g/10 min) | 21 | 22 | 20 | 21 | 20 | 21 |
| (2) Flexural modulus (MPa) | 2320 | 2260 | 2280 | 2270 | 2300 | 2310 |
| (3) Izod impact strength (J/m) | 310 | 390 | 320 | 400 | 400 | 370 |
| (4) High-velocity surface impact strength (J) | 21.0 | 23.7 | 21.3 | 24.5 | 24.5 | 23.6 |
| (5) High-velocity tensile elongation (%) | 34 | 43 | 35 | 45 | 46 | 41 |

TABLE 3-3

| Ingredients | Comparative Example 3 | 4 | 5 | 6 | 7 | 8 |
|---|---|---|---|---|---|---|
| Propylene/ethylene-propylene block copolymer | | | | | | |
| a-1 | | | 59 | 59 | 59 | 54 |
| a-2 | 59 | 59 | | | | |
| Ethylene-1-octene copolymer rubber | | | | | | |
| b-1 | 16 | 13 | | 13 | 13 | 13 |
| b-2 | | | | | | |
| b-3 | | | | | | |
| Ethylene-1-butene copolymer rubber | | | | | | |
| b-4 | | | | | | |
| b-5 | | | | | | |
| b-6 | | | | | | |
| Ethylene-1-hexene copolymer rubber | | | | | | |
| b-7 | | | | | | |
| Ethylene-1-hexene-1-butene copolymer rubber | | | | | | |
| b-8 | | | | | | |
| Ethylene-propylene copolymer rubber | | | | | | |
| b-9 Ethylene block copolymer | | | 13 | | | |
| c-1 | | | 3 | 3 | 3 | 3 |
| c-2 | | | | | | |
| c-3 | | | | | | |

TABLE 3-3-continued

| | Comparative Example | | | | | |
|---|---|---|---|---|---|---|
| Ingredients | 3 | 4 | 5 | 6 | 7 | 8 |
| Talc | | | | | | |
| d-1 | 25 | 25 | 25 | | | 30 |
| d-2 | | | | 25 | | |
| d-3 | | | | | 25 | |
| Evaluation results | | | | | | |
| (1) Melt flow rate (g/10 min) | 22 | 22 | 17 | 22 | 22 | 17 |
| (2) Flexural modulus (MPa) | 1960 | 2010 | 2300 | 2320 | 2300 | 2690 |
| (3) Izod impact strength (J/m) | 360 | 380 | 290 | 340 | 300 | 290 |
| (4) High-velocity surface impact strength (J) | 17.1 | 18.1 | 16.8 | 19.0 | 17.3 | 18.4 |
| (5) High-velocity tensile elongation (%) | 48 | 56 | 34 | 29 | 31 | 15 |

As Example 1 in Table 1 shows, the molded articles obtained from the polyolefin resin molding composition (A) according to the present invention are excellent in rigidity, impact resistance, and flowability. On the other hand, the composition of Comparative Example 1, which does not contain a high-rigidity propylene/ethylene-propylene block copolymer (a) is inferior in balance between rigidity and impact resistance, especially in rigidity, to the composition of Example 1, which contains a high-rigidity propylene/ethylene-propylene block copolymer (a).

As Example 2 in Table 2 shows, the molded articles obtained from the polyolefin resin molding composition (B) according to the present invention are excellent in rigidity, impact resistance, and flowability. On the other hand, the composition of Comparative Example 2, which does not contain a high-rigidity propylene/ethylene-propylene block copolymer (a) is inferior in balance between rigidity and impact resistance, especially in rigidity, to the composition of Example 2, which contains a high-rigidity propylene/ethylene-propylene block copolymer (a), as in the results given in Table 1.

As Examples 3 to 14 in Table 3 show, the molded articles obtained from the polyolefin resin molding compositions (F) according to the present invention are excellent in rigidity, impact resistance, and flowability. Specifically, satisfactory resin compositions for interior automotive use are obtained which have an MFR of 20 g/10 min or higher and give a molded article having a flexural modulus at room temperature of 2,200 MPa or higher and an Izod impact strength at room temperature of 300 J/m or higher; these properties are required of materials for interior automotive use. Furthermore, molded resin articles for interior automotive use having a high-velocity surface impact strength at 23° C. (impactor velocity: 4 m/s) of 20 J or higher and a high-velocity tensile elongation at 23° C. (cross-head speed: 4 m/s) of 30% or higher are obtained from those resin compositions having an MFR of 20 g/10 min or higher.

On the other hand, the compositions of Comparative Examples 3 and 4, which do not contain a high-rigidity propylene/ethylene-propylene block copolymer (a), are inferior in balance between rigidity and impact resistance to the compositions of Examples 3 and 4, which contain a high-rigidity propylene/ethylene-propylene block copolymer (a).

The composition of Comparative Example 5, which is an example of resin compositions containing an ethylene-(higher α-olefin) copolymer rubber (b) having a long period exceeding 14 nm, is unsuitable for practical use because the impact resistance and high-velocity tensile elongation thereof are considerably low.

The compositions respectively containing a talc having an average particle diameter exceeding 3 μm (Comparative Example 6) and a talc having a particle size distribution with a standard deviation exceeding 0.2 (Comparative Example 7) are reduced in high-velocity surface impact resistance and high-velocity tensile elongation and are hence unable to conform to regulations regarding head protection against impacts. Furthermore, the composition of Comparative Example 8, which contains talc (d) in an amount exceeding 25% by weight, is reduced in flowability, high-velocity surface impact resistance, and high-velocity tensile elongation due to the addition of a large amount of talc, and is hence unsuitable for practical use.

Possibility of Industrial Application

The molded articles obtained from the resin compositions of the present invention have an excellent balance between rigidity and impact resistance as compared with molded articles obtained from conventional resin compositions and further have satisfactory flowability, because the compositions comprise a specific propylene block copolymer composition and a specific ethylene-(higher α-olefin) copolymer rubber and optionally contain an ethylene block copolymer and/or a specific talc. Therefore, it is possible to attain size increase and thickness reduction especially in interior automotive parts, whereby weight and cost reductions can be attained. Furthermore, since the compositions of the invention are excellent especially in surface impact resistance while retaining rigidity, they are suitable for use as interior automotive parts conforming to regulations regarding head protection against impacts. The compositions are hence exceedingly useful materials.

What is claimed is:

1. A polyolefin resin composition (A) comprising:
   (a) from 83 to 88% by weight high-rigidity polypropylene/propylene-ethylene block copolymer consisting of from 60 to 95% by weight of a propylene homopolymer component which has an isotactic pentad content (P) of 0.96 or higher and an $M_w/M_n$ (Q value) of 6 or lower and in which the ratio of the maximum value of melt flow rate ($MFR_{max}$) to the minimum value thereof ($MFR_{min}$) satisfies the relationship $$0.1 \leq \text{Log}(MFR_{max}/MFR_{min}) \leq 1 \tag{1}$$

and from 5 to 40% by weight of an ethylene-propylene copolymer component having an ethylene content of from 30 to 80% by weight, wherein the melt flow rates are measured according to ASTM D1238 at a temperature of 230° C. and a load of 2.16 kg; and (b) from 12 to 17% by weight ethylene-(higher α-olefin) copolymer rubber having an ethylene content of 45% by weight or higher and containing polyethylene crystals having a value of long period as determined by Small angle X-ray scattering of from 6 to 14 nm, provided that the sum of (a) and (b) is 100% by weight.

2. A polyolefin resin composition (B) comprising:
from 78 to 87% by weight the high-rigidity polypropylene/propylene-ethylene block copolymer (a) described in claim 1; from 12 to 17% by weight the ethylene-(higher α-olefin) copolymer rubber (b) described in claim 1; and (c) from 1 to 5% by weight hydrogenated diene block copolymer which has a degree of hydrogenation of 85% or higher and is derived from an A-B-A or A-B diene block copolymer wherein segment A is a 1,4-polybutadiene block and segment B is a 1,2-polybutadiene block, a polyisoprene block, or a butadiene-isoprene copolymer block, provided that the sum of (a), (b), and (c) is 100% by weight.

3. The polyolefin resin composition (C) of claim 1, wherein the ethylene-(higher α-olefin) copolymer rubber (b) has a long period of from 8 to 12 nm.

4. The polyolefin resin composition (D) of claim 1, wherein the ethylene-(higher α-olefin) copolymer rubber (b) is a binary and/or ternary random copolymer formed from ethylene and one or more higher α-olefins having 4 or more carbon atoms.

5. The polyolefin resin composition (E) of claim 2, wherein the hydrogenated diene block copolymer (c) is (1) an A-B-A diene block copolymer wherein segment A is a 1,4-polybutadiene block and segment B is a 1,2-polybutadiene block or (2) an A-B diene block copolymer wherein segment A is a 1,4-polybutadiene block and segment B is a butadiene-isoprene copolymer block, said copolymers (1) and (2) each having a degree of hydrogenation of 85% or higher.

6. A polyolefin resin molding composition (F) comprising:

from 75 to 80% by weight the polyolefin resin composition of claim 1; and (d) from 20 to 25% by weight talc having an average particle diameter of 3 μm or smaller and a narrow particle size distribution with a particle diameter standard deviation of 0.2 or smaller.

7. A molded resin part for interior automotive use which is a molded article obtained by molding the polyolefin resin molding composition of claim 6 having a melt flow rate (MFR; ASTM D1238) of 20 g/10 min or higher, said molded article having a flexural modulus at 23° C. (ASTM D790) of 2,200 MPa or higher and an Izod impact strength at room temperature (ASTM D256) of 300 J/m or higher.

8. A molded resin part for interior automotive use which is a molded article obtained by molding the polyolefin resin molding composition of claim 6 having an MFR (ASTM D1238) of 20 g/10 min or higher, said molded article having a high-velocity surface impact strength at 23° C. (impactor velocity: 4 m/s) of 20 J or higher and a high-velocity tensile elongation at 23° C. (cross-head speed: 4 m/s) of 30% or higher.

* * * * *